United States Patent
Waibel

(10) Patent No.: US 7,342,649 B2
(45) Date of Patent: Mar. 11, 2008

(54) HANDHELD SURVEY DOCUMENTATION SYSTEM

(75) Inventor: Reinhard Waibel, Berneck (CH)

(73) Assignee: Hilti Akitengesellschaft, Schaan (LI)

( * ) Notice: Subject to any disclaimer, the term of this patent is extended or adjusted under 35 U.S.C. 154(b) by 0 days.

(21) Appl. No.: 11/395,451

(22) Filed: Mar. 30, 2006

(65) Prior Publication Data
US 2006/0244944 A1 Nov. 2, 2006

(30) Foreign Application Priority Data
Apr. 29, 2005 (DE) ............ 10 2005 000 047

(51) Int. Cl.
*G01C 3/08* (2006.01)

(52) U.S. Cl. ................................. 356/5.01

(58) Field of Classification Search ............... 356/5.01
See application file for complete search history.

(56) References Cited

U.S. PATENT DOCUMENTS 5,291,262 A * 3/1994 Dunne ............ 356/5.06

* cited by examiner

*Primary Examiner*—Thomas H. Tarcza
*Assistant Examiner*—Luke D. Ratcliffe
(74) *Attorney, Agent, or Firm*—Abelman, Frayne & Schwab

(57) ABSTRACT

A handheld computer which is connectable to an optoelectronic distance measuring device in an integrated manner so as to communicate bidirectionally therewith or connectable via a data interface, includes a computing device, an input device, and a display suitable for marking and displaying a graphic object. In a repeated sequence, an algorithm designed for interacting with the optoelectronic distance measuring device waits, in a marking step, for a marking event initiated by the user through the input device when marking an object of a graphic representation that is displayed by the display, and in a survey step which is close in time to the marking event, waits for a survey event which is triggered by a survey result measured by the user through use of the optoelectronic distance measuring device, whereupon the survey result is associated with the marked object in a subsequent association step.

21 Claims, 2 Drawing Sheets

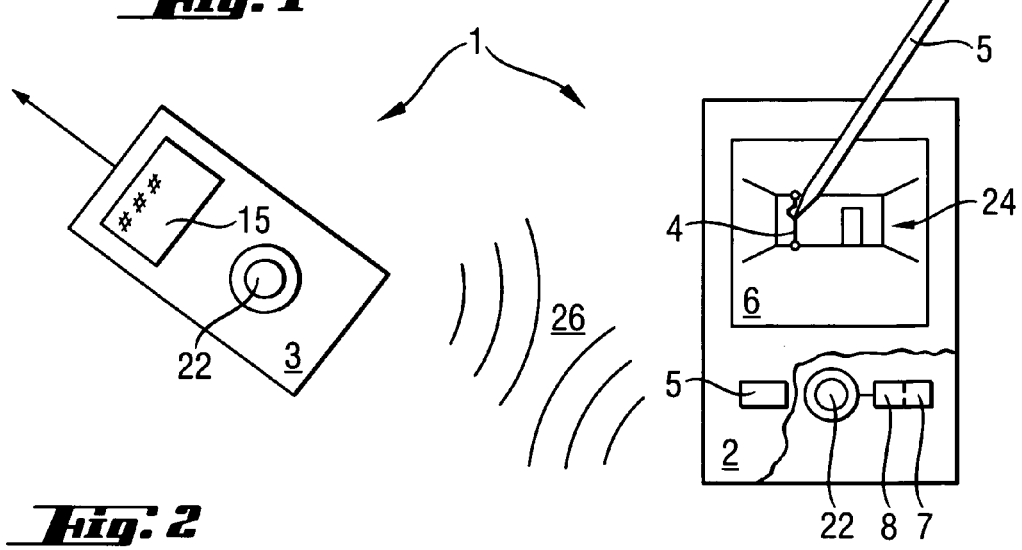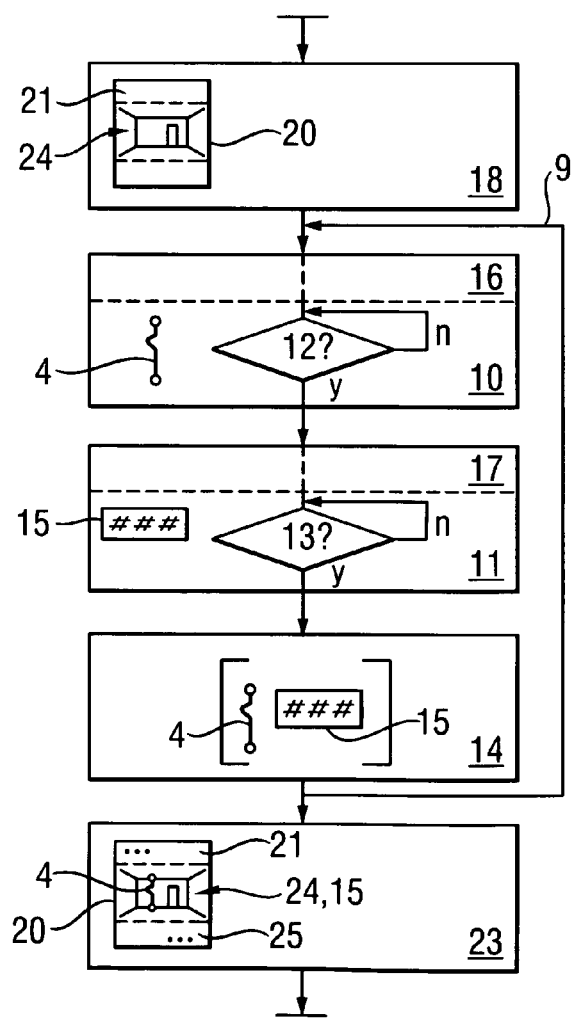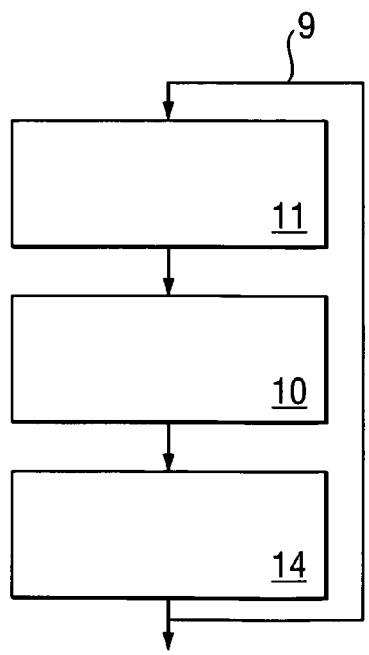

HANDHELD SURVEY DOCUMENTATION SYSTEM

BACKGROUND OF THE INVENTION

1. Field of the Invention

The invention is directed to a handheld survey documentation system based on a handheld computer, particularly for use in the building industry, and to an associated program algorithm.

2. Description of the Prior Art

At the present time, when acquiring survey measurements, particularly distances, areas and volumes, for describing a building layout, sketches are usually prepared by hand to illustrate the building layout, and the survey measurements are then noted on the sketch and associated with geometric objects. Occasionally, a digital photograph of the building layout is also taken in addition for purposes of documentation. This process is cumbersome, prone to errors and costly. It also cannot be further processed electronically and is time-consuming.

DE10055510 discloses a handheld laser distance measuring device which is connected to an optical camera for recording the measurement situation along the sight line and for marking in the photograph the parallax-free measurement point that is actually measured. The data (photograph with measurement point and measurements) can be transmitted via a data interface to an external computer for documentation and further processing. While a system of this kind is suitable for survey documentation of an individual measurement along the sight line of the laser distance measuring device, it is not suitable in principle for survey documentation of a spatially coherent building layout comprising a large number of individual measurements at different targets or aim points of different reference points.

WO2004036246 discloses a handheld laser distance measuring device which is integrated in a handheld computer or is connected thereto by a data interface. The keyboard and the display of the computer are used for interacting with the laser distance measuring device. Further, an optical camera can also be integrated in the handheld computer. A program algorithm is provided for controlling the laser distance measuring device from the handheld computer. The survey measurements can be further processed subsequently in the handheld computer. An efficient program algorithm for a survey documentation system is not described more fully. In particular, a reliable documentation of the survey results of each individual measurement is not guaranteed. However, acquisition of a building layout in an intuitively simple but reliable manner is important precisely when employing labor forces in the building industry.

SUMMARY OF THE INVENTION

It is the object of the invention to realize a survey documentation system which can be managed in an intuitively simple manner and which is based on a handheld computer and an efficient and dependable program algorithm.

This and other objects of the present invention, which will become apparent hereinafter, are achieved by providing a handheld computer which is connectable to an optoelectronic distance measuring device in an integrated manner so as to communicate bidirectionally or which is connectable to the optoelectronic distance measuring device via a data interface, has input means and display means suitable for marking and displaying a graphic object, and computing means with an algorithm designed for interacting with the optoelectronic distance measuring device.

In the algorithm that is run in the computing means, in a sequence that is repeated a number of times, a marking event is awaited in a marking step, which marking event is initiated by the user using the input means when marking an object of a graphic representation (photograph, CAD display, sketch) that is displayed by the display means, and in a survey step which is close in time to (either before or after) the marking event, a survey event is awaited, which survey event is initiated by a survey result measured by the user by means of the optoelectronic distance measuring device, whereupon the survey result is associated with the marked object in a subsequent association step.

By means of this algorithm, the user is intuitively urged and also compelled in practice to mark each individual measurement beforehand in the graphic representation of the building layout by means of an object. In this way, mistakes or erroneous associations which could be made especially when subsequently processed are practically eliminated.

In the marking step, an object that is already contained in the graphic representation as a basic graphic element (line, curve, polygon, circle, etc.) is advantageously marked by clicking on it so that an object can be marked quickly and intuitively by means of suitable graphic input means (cursor, input stylus, touch screen, etc.).

By clicking on a region without a basic graphic element in an antecedent vectorization step, image information about this region is advantageously analyzed to determine the presence of simple basic graphic elements and the latter are inserted as objects so that objects which are suitable for clicking on are generated automatically from the image information. Vectorization algorithms suitable for this purpose may be used in the invention and are a component part of conventional image processing programs of computers.

A new item drawn by the input means is advantageously marked as an object so that an object can be inserted simply and intuitively into the graphic representation of the building layout, for example, as a freehand drawing with the input stylus of a handheld computer.

The optoelectronic distance measuring device is advantageously initialized in an object-specific measurement mode in the survey step in an antecedent mode-switching step, in particular: distance measurement for lines, area measurement for surfaces (multiplication of two individual measurements), and volume measurement for bodies (multiplication of three individual measurements), so that mistakes on the part of the user are avoided in practice.

The survey results are associated in the association step as displayed numerical values close to the center point of the marked object so that the association of the survey results with the measured object can be discerned intuitively for each individual measurement.

In an antecedent initialization step, a new survey log is advantageously initialized and is filled out by means of input fields that are compulsorily requested of the user for input therein from the user and by data internal to the device (device number, date, time, etc.) so that the log data required for documentation are always available.

The graphic representation is advantageously acquired in the initialization step and further, in an advantageous manner, by means of a camera which is integrated in the handheld computer or in the optoelectronic distance measuring device, so that additional graphic documentation of the building layout can be dispensed with.

In a subsequent signature step, the survey log with the log data, the graphic representation and the survey results associated with the respective object are advantageously signed by a signature that is compulsorily requested of the user for input therein from the user and are stored so that a complete electronic survey document is prepared for further processing and archiving.

The invention will be described more fully with reference to two advantageous example embodiments.

BRIEF DESCRIPTION OF THE DRAWINGS

FIG. 1 shows a schematic view of the survey documentation system according to the present invention;

FIG. 2 shows an algorithm used in the present invention;

FIG. 2a shows a partial variant of the algorithm of FIG. 2;

DETAILED DESCRIPTION OF THE PREFERRED EMBODIMENTS

Figure 3:
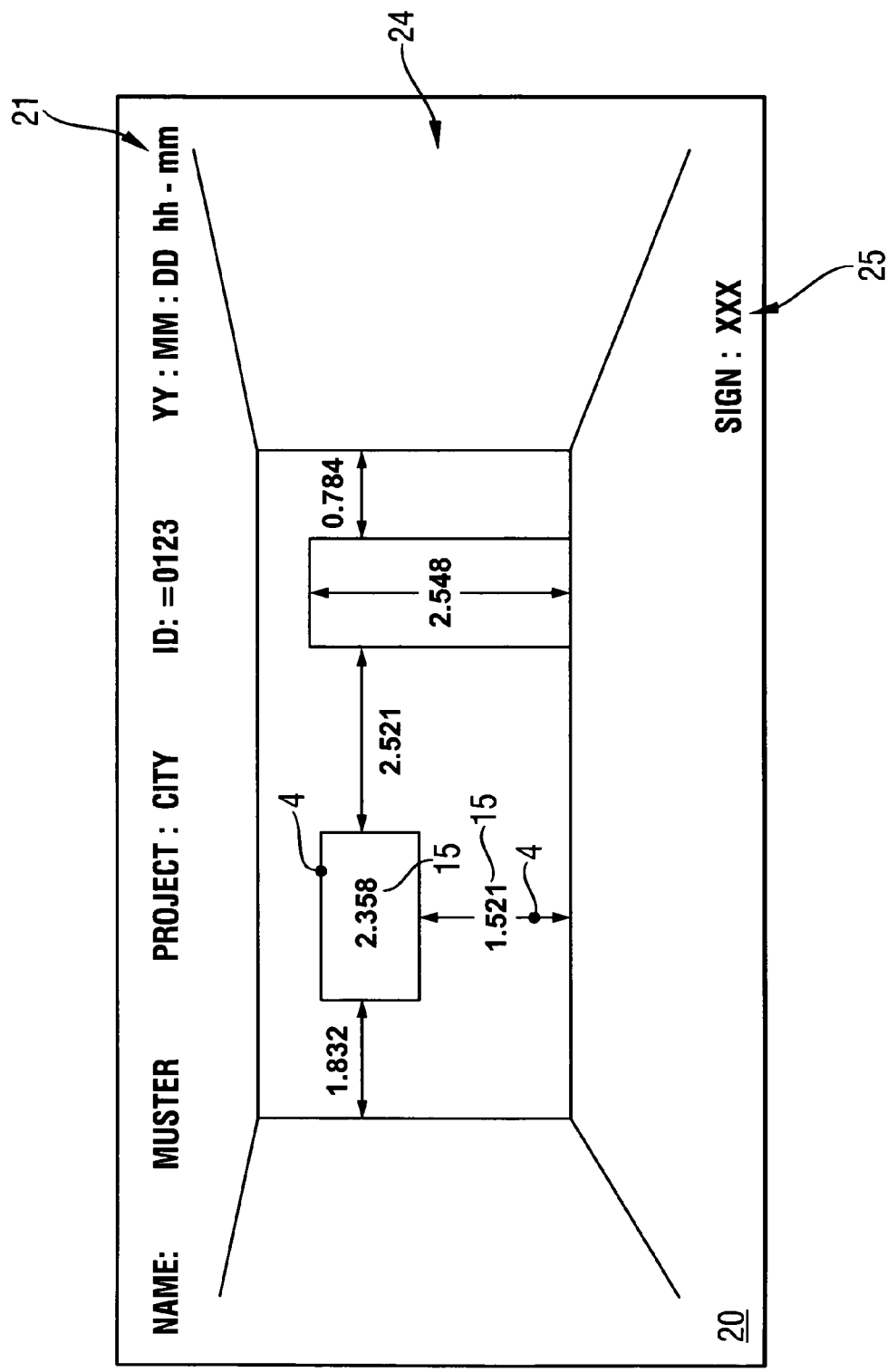
FIG. 3 shows an example electronic survey document.

According to FIG. 1, the survey documentation system 1 comprises a handheld computer 2 which is connectable in an integrated manner to a handheld optoelectronic distance measuring device 3 in the form of a laser distance measuring device so as to communicate bidirectionally therewith by means of a wireless data interface 26 in the form of electromagnetic waves. The handheld computer 2 includes computing means 7 having an algorithm 8 executed and operated by the computing means 7, with the algorithm 8 designed for interaction with the optoelectronic distance measuring device 3. The handheld computer 2 which is constructed, in the disclosed embodiment, as a Personal Digital Assistant (PDA), has input means 5 in the form of an input stylus suitable for marking a graphic object 4, and display means 6 in the form of a graphic display suitable for displaying a graphic object 4 which displays the building layout acquired by a camera 22 integrated in the handheld computer 2 (or in the distance measuring device 3) as a graphic representation 24. A new item that has been drawn by the input means 5 is marked as the graphic object 4. A survey associated with this graphic object 4 is carried out by the optoelectronic distance measuring device 3 which supplies the survey results 15.

According to FIG. 2, the algorithm 8, which is designed modularly for operation with respect to time for sequential execution, has a loop 9 in which a marking step 10 and a survey step 11 are carried out in a sequence which is repeated a number of times. According to FIG. 2, the marking step 10 is carried out prior to the survey step 11. In the alternative partial variant of the algorithm, as shown in FIG. 2a, the survey step 11 is carried out before the marking step 10. In the marking step 10, a marking event 12 is awaited. The marking event 12 is initiated by the user by the input means when marking by clicking on the graphic object 4 of a graphic representation 24 displayed by the display means. In the survey step 11, a survey event 13 is awaited. The survey event 13 is triggered by a survey result 15 that is measured by the user with the optoelectronic distance measuring device 3. In a subsequent association step 14, a survey result 15 is associated with the marked graphic object 4. A vectorization step 16 which is carried out optionally precedes the marking step 10. When clicking on a region without a basic graphic element, image information about this region is analyzed by means of a vectorization algorithm to determine the presence of simple basic graphic elements and the latter are entered as graphic objects 4. In FIG. 2, the survey step 11 is preceded by an optional mode-switching step 17 which initializes the optoelectronic distance measuring device in an object-specific measurement mode. In an initialization step 18 preceding the loop 9, a new survey log 20 is initialized and the log data 21 are filled in by input fields that are compulsorily requested of the user for input therein from the user, including: name, title of project, and data internal to the device, including: device ID, date, and time. In addition, the graphic representation 24 of the building layout is acquired in the initialization step 18 by means of the camera 22, shown in FIG. 1, which is integrated in the handheld computer 2. In a signature step 23 following the loop 9, the survey log 20 with the log data 21, the graphic representation 24 and the survey results 15 associated with the respective graphic objects 4 are signed and stored by means of a signature 25 that is compulsorily requested from the user.

According to FIG. 3, an example embodiment of a complete electronic survey log 20 is shown which has the log data 21, the graphic representation 24 of the building layout and the signature 25. The survey results 15 are associated for each individual measurement (distance, area) as a digitally displayed numerical value close to the center of the marked graphic object 4.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A handheld computer which is connectable to an optoelectronic distance measuring device (3) in an integrated manner so as to communicate bidirectionally therewith or which is connectable to the optoelectronic distance measuring device (3) via a data interface (26), comprising:
   computing means (7);
   an algorithm (8) executed by the computing means (7) and designed for interacting with the optoelectronic distance measuring device (3);
   input means (5) connectable to the computing means (7); and
   display means (6) suitable for marking and displaying a graphic object (4) generated by the computing means (7) using the algorithm (8) and inputs from the user through the input means (5),
   wherein the computing means (7) of the handheld computer (2) implements the algorithm (8) in a sequence that is repeated a number of times, to wait for a marking event (12) to occur in a marking step (10), which marking event (12) is initiated by the user by the input means (5) when marking the graphic object (4) displayed in the graphic representation (24) displayed by the display means (6), and to wait for a survey event (13) to occur in a survey step (11) which is close in time to the marking event (12), which survey event (13) is triggered by a survey result (15) measured by the user by means of the optoelectronic distance measuring device (3), whereupon the survey result (15) is associated with the marked graphic object (4) in a subsequent association step (14).

2. The handheld computer according to claim 1, wherein the graphic object (4) that is already contained in the graphic representation (24) as a basic graphic element is marked in the marking step (10) by clicking on the graphic object (4).

3. The handheld computer according to claim 2, wherein in the marking step (10) when clicking on a region displayed by the display means (6) without a basic graphic element in an antecedent vectorization step (16), image information about the region is analyzed to determine the presence of a simple basic graphic element, and any present simple basic graphic elements are inserted as the graphic object (4).

4. The handheld computer according to claim 3, wherein a new item drawn by the input means (5) is marked as the graphic object (4).

5. The handheld computer according to claim 4, wherein the optoelectronic distance measuring device (3) is initialized in an object-specific measurement mode in the survey step (11) in an antecedent mode-switching step (17).

6. The handheld computer according to claim 5, wherein the survey result (15) is associated in the association step (14) as displayed numerical values close to the center of the marked graphic object (4).

7. The handheld computer according to claim 6, wherein a new survey log (20) is initialized in an antecedent initialization step (18) and is filled out by means of input fields that are compulsorily requested of the user for input therein from the user, and by data internal to the optoelectronic distance measuring device (3).

8. The handheld computer according to claim 7, wherein the graphic representation (24) is acquired in the initialization step (18), by means of a camera (22) which is integrated in the handheld computer (2) or in the optoelectronic distance measuring device (3).

9. The handheld computer according to claim 7, wherein the survey log (20) with the log data (21), the graphic representation (24) and the survey result (15) associated with a respective graphic object (4) are signed in a subsequent signature step (23) by a signature (25) that is compulsorily requested from the user and are stored.

10. The handheld computer according to claim 8, wherein the survey log (20) with the log data (21), the graphic representation (24) and the survey result (15) associated with a respective graphic object (4) are signed in a subsequent signature step (23) by a signature (25) that is compulsorily requested from the user and is stored.

11. A method using a handheld computer which is connectable to an optoelectronic distance measuring device (3) in an integrated manner so as to communicate bidirectionally or which is connectable to the optoelectronic distance measuring device (3) via a data interface (26), the method comprising the steps of:
providing the handheld computer including computing means (7), an algorithm (8) executed by the computing means (7) and designed for interacting with the optoelectronic distance measuring device (3), input means (5) connectable to the computing means (7), and display means (6) suitable for marking and displaying a graphic object (4) generated by the computing means (7) using the algorithm (8) and inputs from the user through the input means (5);
repeating a sequence a number of times, using the computing means (7) of the handheld computer (2), to wait for a marking event (12) to occur in a marking step (10), which marking event (12) is initiated by the user by the input means (5) when marking the graphic object (4) displayed in the graphic representation (24) displayed by the display means (6);
repeating the sequence a number of times, using the computing means (7) of the handheld computer (2), to wait for a survey event (13) to occur in a survey step (11) which is close in time to the marking event (12), which survey event (13) is triggered by a survey result (15) measured by the user by means of the optoelectronic distance measuring device (3), whereupon the survey result (15) is associated with the marked graphic object (4) in a subsequent association step (14); and
outputting a display including the marked graphic object (4) in the graphic representation (24) using the display means (6).

12. The method according to claim 11, wherein the graphic object (4) that is already contained in the graphic representation (24) as a basic graphic element is marked in the marking step (10) by clicking on the graphic object (4).

13. The method according to claim 12, wherein, in the marking step (10), when clicking on a region displayed by the display means (6) without a basic graphic element in an antecedent vectorization step (16), image information about the region is analyzed to determine the presence of a simple basic graphic element, and any present simple basic graphic elements are inserted as the graphic object (4).

14. The method according to claim 13, wherein a new item drawn by the input means (5) is marked as the graphic object (4).

15. The method according to claim 14, wherein the optoelectronic distance measuring device (3) is initialized in an object-specific measurement mode in the survey step (11) in an antecedent mode-switching step (17).

16. The method according to claim 15, wherein the survey result (15) is associated in the association step (14) as displayed numerical values close to the center of the marked graphic object (4).

17. The method according to claim 16, wherein a new survey log (20) is initialized in an antecedent initialization step (18) and is filled out by means of input fields that are compulsorily requested of the user for input therein from the user, and by data internal to the optoelectronic distance measuring device (3).

18. The method according to claim 17, wherein the graphic representation (24) is acquired in the initialization step (18), by means of a camera (22) which is integrated in the handheld computer (2) or in the optoelectronic distance measuring device (3).

19. The method according to claim 17, wherein the survey log (20) with the log data (21), the graphic representation (24) and the survey result (15) associated with a respective graphic object (4) are signed in a subsequent signature step (23) by a signature (25) that is compulsorily requested from the user and are stored.

20. The method according to claim 18, wherein the survey log (20) with the log data (21), the graphic representation (24) and the survey result (15) associated with a respective graphic object (4) are signed in a subsequent signature step (23) by a signature (25) that is compulsorily requested from the user and are stored.

21. A handheld computer which is connectable to an optoelectronic distance measuring device (3) in an integrated manner so as to communicate bidirectionally therewith or which is connectable to the optoelectronic distance measuring device (3) via a data interface (26), comprising:
computing means (7);
an algorithm (8) executed by the computing means (7) and designed for interacting with the optoelectronic distance measuring device (3);
input means (5) in form of an input stylus suitable for marking a graphic object (4) and connectable to the computing means (7); and
display means (6) suitable for marking and displaying a graphic object (4) generated by the computing means (7) using the algorithm (8) and inputs from the user through the input means (5).

* * * * *